(12) United States Patent
Fey

(10) Patent No.: US 7,984,419 B2
(45) Date of Patent: Jul. 19, 2011

(54) SYSTEM AND METHOD FOR SEPARATING CODE SHARING AND ACTIVE APPLICATIONS IN AN OSGI SERVICE PLATFORM

(75) Inventor: Daniel Fey, Budapest (HU)

(73) Assignee: Nokia Corporation, Espoo (FI)

( * ) Notice: Subject to any disclaimer, the term of this patent is extended or adjusted under 35 U.S.C. 154(b) by 1761 days.

(21) Appl. No.: 11/113,561

(22) Filed: Apr. 25, 2005

(65) Prior Publication Data

US 2006/0242625 A1    Oct. 26, 2006

(51) Int. Cl.
    G06F 9/44     (2006.01)
    G06F 9/45     (2006.01)
    G06F 3/00     (2006.01)

(52) U.S. Cl. ........ 717/108; 717/116; 717/118; 717/121; 717/165; 719/329; 719/332

(58) Field of Classification Search .................. None
See application file for complete search history.

(56) References Cited

U.S. PATENT DOCUMENTS

| | | | | |
|---|---|---|---|---|
| 2003/0014521 | A1* | 1/2003 | Elson et al. | 709/225 |
| 2003/0191823 | A1* | 10/2003 | Bansal et al. | 709/220 |
| 2004/0194059 | A1* | 9/2004 | Akella et al. | 717/118 |
| 2005/0097052 | A1* | 5/2005 | Systa et al. | 705/51 |
| 2005/0138037 | A1* | 6/2005 | Son et al. | 707/10 |
| 2005/0154785 | A1* | 7/2005 | Reed et al. | 709/217 |
| 2005/0223101 | A1* | 10/2005 | Hayes, Jr. | 709/228 |
| 2006/0233126 | A1* | 10/2006 | Herenyi et al. | 370/328 |

OTHER PUBLICATIONS

Liang et al., "Bundle Dependency in Open Services Gateway initiative Framework Initialization", 2002 IEEE, pp. 122-126.*

Luna: a Flexible Java Protection System, Chris Hawblitzel, Thorsten Von Eicken, www.cs.dartmouth.edu, Apr. 25, 2005, pp. 1-14.
Java-oriented Active Network Operating System, The Janos Project, www.cs.utah.edu, Apr. 25, 2005, pp. 1-2.
J-Seal2, www.iseal2.com, Apr. 25, 2005, 1 pg.
The Alta Virtual Machine, The Nested Process Model in Java, www.cs.utah.edu, Apr. 25, 2005, pp. 1-2.
JKernel & JServer, www.cs.cornell.edu, Apr. 25, 2005, 1 pg.
NOMADS: A Java Based Mobile Agent System, Institute for Human and Machine Cognition (IHMC), www.ihmc.us, pp. 1-2.
Isolation, Resource Management and Sharing in the Kaffeos Java Runtime System, Godmar Back, University of Utah, U.S.A., May 2002, pp. 1-163.
Unbreakable Java The Java Server that Never Goes Down, Thomas Smits, Copyright 2004, pp. 1-5.
A Java Operating System as the Foundation of a Secure Network Operating System, Golm et al., Germany, Aug. 2002, pp. 1-14.
Building And Using Static And Shared "C" Libraries, http://users.actcom.co.il, Aug. 15, 2005, pp. 1-9.
How to Write Shared Libraries, Ulrich Drepper, Jan. 22, 2005, pp. 1-45.

* cited by examiner

*Primary Examiner* — Tuan Q Dam
*Assistant Examiner* — Isaac T Tecklu
(74) *Attorney, Agent, or Firm* — AlbertDhand LLP

(57) ABSTRACT

A system and method for categorizing bundles into two categories in an OSGi framework. The first type of bundle is referred to as a code sharing bundle, while the second type of bundle is referred to as an application bundle. Code sharing bundles are primarily static in nature and act as libraries, while application bundles are dynamic and contain active applications. This arrangement reduces dependencies between bundles, as well as providing a number of additional benefits.

21 Claims, 6 Drawing Sheets

SYSTEM AND METHOD FOR SEPARATING CODE SHARING AND ACTIVE APPLICATIONS IN AN OSGI SERVICE PLATFORM

FIELD OF THE INVENTION

The present invention relates generally to the OSGi service platform. More particularly, the present invention relates to the provision of code sharing and active applications in an OSGi service platform.

BACKGROUND OF THE INVENTION

Java is an object oriented language that is used in a wide variety of applications and devices. Java-based applications are robust, portable across multiple platforms, and provide a highly dynamic run time environment.

If a field of a Java class is declared to be static, exactly one incarnation of this field exists, regardless of how many instances of the class may eventually be created. A static field, which is sometimes referred to as a class variable, is created when the class is initialized. Initialization of a class involves the execution of special code blocks, referred to herein as static initializers, and the initializers of static fields declared in the class. Initialization of a Java interface involves executing the initializers for fields declared in the Java interface. As used herein, the term "Java interface" refers that which is described as an "interface" in the Java Language Specification. Java does not restrict the code that is executed in the static initializers or the initializers of the static fields in terms of resource consumption—objects and threads can be created during the initialization process without limitation.

A class or Java interface type T will be initialized immediately before one of the following occurs: (1) T is a class and an instance of T is created; (2) T is a class and a static method of T is invoked; or (3) A nonconstant static field of T is used or assigned. A constant field is a field that is either explicitly or implicitly both final and static and is initialized with the value of a compile-time constant expression. It should be noted that fields of Java interfaces are implicitly public static and final. A reference to nonconstant static field must be resolved at the compilation time to a copy of the compile-time constant value, so that uses of such a field never cause initialization.

The Java language defines the concept of threads. Threads independently execute code that operates on values and objects residing in a shared main memory. Virtual machines usually support the execution of multiple threads at a time. The Java programming language supports the coding of programs that, though concurrent, still exhibit deterministic behavior by providing mechanisms for synchronizing the concurrent activity of threads. To synchronize threads, the Java programming language uses monitors, which are high-level mechanisms for allowing only one thread at a time to execute a region of code or a complete method protected by the monitor. The behavior of monitors is explained in terms of locks; there is a lock associated with each object.

A synchronized method automatically performs a lock action when it is invoked; the body is not executed until the lock action has successfully completed. If the method comprises an instance method, it locks the lock associated with the instance for which it was invoked. If the method is static, it locks the lock associated with the class object that represents the class in which the method is defined. If the execution of the method's body is ever completed (either normally or abruptly), an unlock action is automatically performed on that same lock.

OSGi, which stands for "Open Services Gateway Initiative" and is discussed at the URL www.osgi.org, is an open, common architecture to deploy and manage services in a coordinated manner. OSGi provides a general-purpose, secure, managed Java-based framework that supports the deployment of extensible and downloadable service applications known as bundles. OSGi-compliant devices can download and install OSGi deployment entities and remove them when they are no longer required. Installed and started bundles can register a number of services that can be shared with other bundles under strict control of the framework.

OSGi can run on the top of a standard Java virtual machine (VM). Contrary to traditional methods where one Java application runs on one VM, several bundles can be simultaneously run on the same VM in OSGi. Using OSGi, there is no need to load and execute the VM as many times as the number of the running Java applications. Thus, memory consumption is greatly reduced.

OSGi bundles have a well-defined lifecycle, which is depicted in FIG. 1. The framework reports the lifecycle changes of bundles to other bundles via events of class "BundleEvent".

In order to ensure that the resource consumption of the OSGi runtime is not growing continuously, when a bundle is stopped, it must release all of the resources that had been allocated since activation, as is required in Section 4.8.7 of the current OSGi R3 specification. According to Section 4.8.7 of the OSGi R3 specification, the BundleActivator interface defines a "public void stop (BundleContext context) throws Exception" method, which is invoked by the framework to stop a bundle. This method must release any resources that were allocated since activation. All threads associated with the stopping bundle should be stopped immediately.

An important feature of bundles is that they are able to share Java code with other bundles. Technically, this is achieved by exporting a part of the Java packages contained by the bundle, permitting other bundles to import and use these packages. Package sharing in the standard OSGi framework is depicted in FIG. 4. Exported packages may contain any kind of Java code. Bundles that import the same exported packages of another bundle will see the same incarnations of static fields. The availability of the exported packages is tied to the lifecycle stages of the bundle; the exported packages must be made continuously available while the bundle is cycling between RESOLVED and ACTIVE states. If the bundle's dependencies are resolved, selected packages must be exported. Packages exported by a stopped bundle continue to be available to other bundles. This continued export implies that other bundles can execute code from a stopped bundle.

OSGi also introduces the concept of "service." According to the current OSGi R3 framework specification, for the OSGi service platform, bundles are built around a set of cooperating services that are available from a shared service registry. Such an OSGi service is defined semantically by its service interface and is implemented as a service object. The service interface should be specified with as few implementation details as possible. The service object is owned by, and runs within, a bundle. This bundle must register the service object with the framework service registry so that the service's functionality is available to other bundles under the control of the framework.

Dependencies between the bundle that owns the service and the bundles using the service are managed by the framework. For example, when a bundle is stopped, all of its services registered with the framework will be automatically unregistered. The framework maps services to their underlying service objects and provides a query mechanism that enables an installed bundle to request the services it needs. The framework also provides an event mechanism so that bundles can receive events of service objects that are registered, modified, or unregistered.

For the reporting of registration, unregistration, and property changes of service objects, all events of this type must be delivered synchronously.

The OSGi specifications currently require that a stopping bundle must stop its threads and clean up its resources. At the same time, OSGi does not specify any infrastructure that makes this requirement enforceable. Malicious bundles or bug-prone bundles may ignore this requirement. As a result, only a full restart of the framework can address this issue. Unfortunately, a full restart interrupts the availability of the functionality provided by the OSGi runtime. In a system that is expected to run in a 24/7 environment and provide crucial functionality, such a deficiency is not tolerable.

The OSGi specifications also require that the exported packages of a bundle need to be available even when a bundle is stopped. The users or importers of the exported packages must not experience the exported packages becoming inconsistent as a consequence of the stopping of the exporting bundles. An OSGi-compliant solution for forced bundle stopping must ensure these requirements. However, the forceful termination of a bundle and the reclamation of its resources can result in this precise problem. Therefore, the forced stopping must reclaim only the resources that are not visible by the users of the exported packages.

Due to the activities performed in the static initializers, as well as the activities performed in the initializers of static fields of the classes contained by the exported packages and those packages that are not actually exported but are used from the code of exported packages, a bundle may consume resources and may create and start threads even if it has never been started (i.e. the bundle is stays in the RESOLVED state). Bundles staying in the RESOLVED state cannot be stopped, since the stop operation is defined only for bundles being in the ACTIVE state. OSGi does not define any facilities that can be used to ask such a bundle in the RESOLVED state to clean up its resources.

It would therefore be desirable to develop a system and method that enables the possibility of forced resource reclamation without having to restart the whole OS process running the Java VM that powers the OSGi runtime.

SUMMARY OF THE INVENTION

The present invention provides for a system and method where, in the current OSGi framework, a single bundle can serve two purposes at the same time. First, a single bundle can provide active computing capabilities by its own threads and initiated objects directly for the end user or for other bundles in the form of services. Second, the bundle can share code with other bundles, such as an API implementation, using the package export mechanism defined by OSGi.

With the present invention, the stopping of active bundles can be enforced, and bundles' resources can be reclaimed without risk that the exported packages will become inconsistent, which could prevent users of the exported packages from continuing their respective operations. Additionally, the communication between bundles becomes much more perspicuous with the present invention, since the inter-bundle communication occurs only via well-defined service interfaces. The number of dependencies between bundles can also be reduced with the implementation of the present invention.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
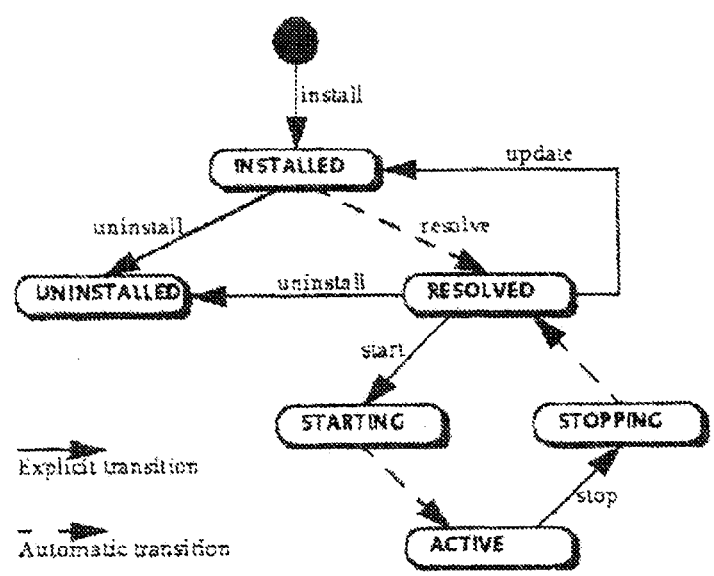
FIG. 1 is a representation showing the lifecycle of OSGi bundles.
Figure 2:
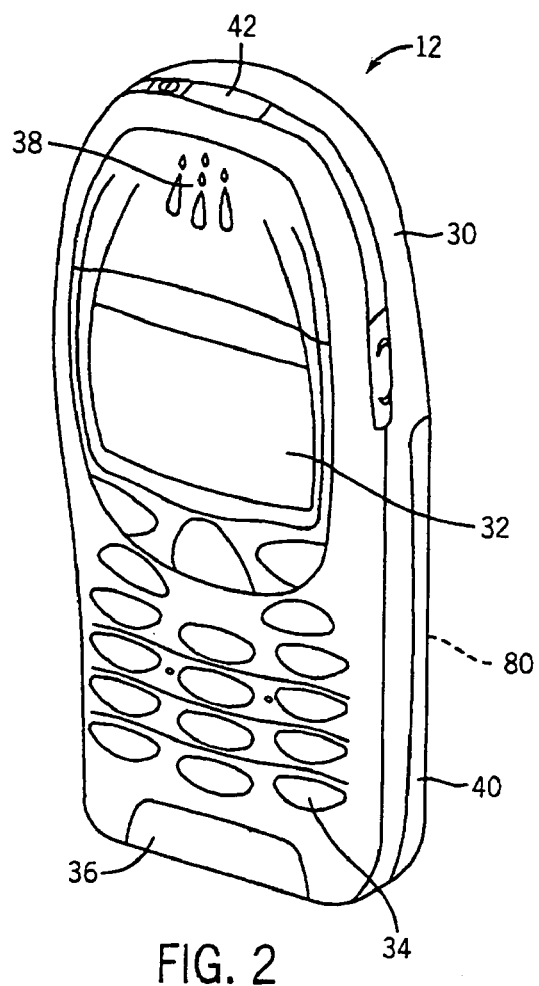
FIG. 2 is a perspective view of a mobile telephone that can be used in the implementation of the present invention.
Figure 3:
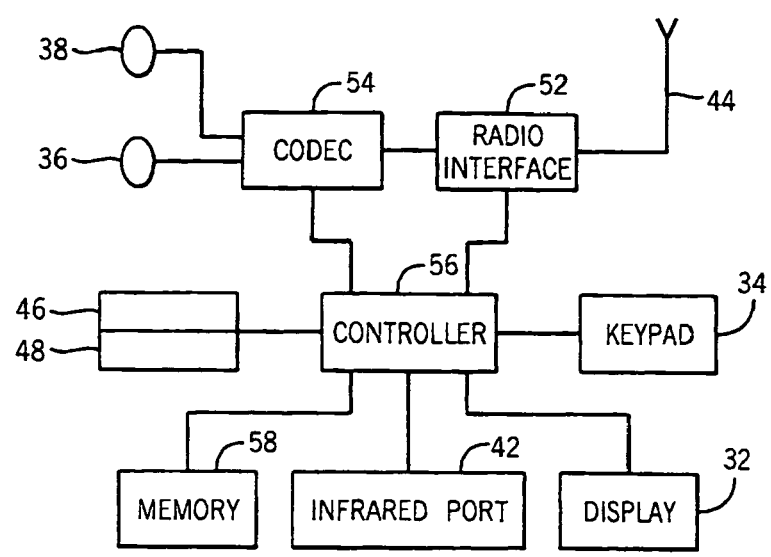
FIG. 3 is a schematic representation of the telephone circuitry of the mobile telephone of FIG. 2.
Figure 4:
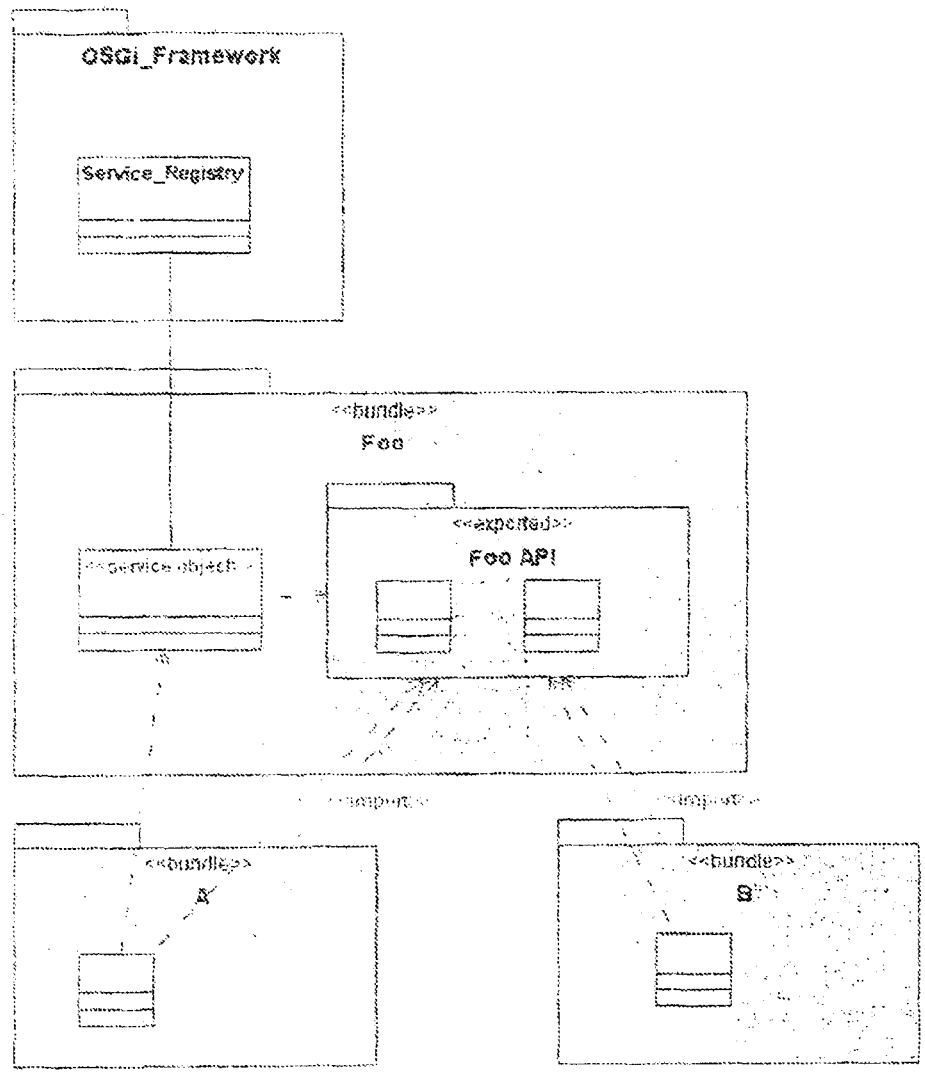
FIG. 4 is a standard UML diagram showing a representation of the package sharing process in a standard OSGi framework.

FIGS. 2 and 3 show one representative mobile telephone 12 within which the present invention may be implemented. It should be understood, however, that the present invention can be implemented into a wide variety of electronic devices, including personal computers, personal digital assistants, integrated messaging devices, and other electronic devices where a Java VM and an OSGi implementation is or will be available. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

According to the principles of the present invention and using the current OSGi framework, a single bundle can serve two different purposes at the same time. First, the bundle can provide active computing capabilities by its own threads and initialized objects directly for the end user, or for other bundles in the form of services. Second, the same bundle can share code with other bundles, such as in an API implementation.

The present invention separates the functionality of code sharing and active applications. The invention introduces two disjunctive types of bundles. The first bundle type is a code sharing bundle. Code sharing bundles only serve the purpose of sharing classes (and Java interfaces), as well as other resources, such as images, that are packaged together with the classes, in a manner similar to how shared libraries act in legacy operating systems. A code sharing bundle can export a subset or the entire set of its packages, with no constraints regarding the contents of the shared packages. Code sharing bundles can never reach the ACTIVE state. Additionally, no resource consumption can be generated by a code sharing bundle, except for resource consumption that is needed for storing the code of non-initialized classes of the code sharing bundle. In other words, static fields of classes are not incarnated inside the code sharing bundle. All classes of code sharing bundles, regardless of whether they are in exported packages or not, must be repeatedly initialized for each client bundle that uses the code of the code sharing bundle, and every client bundle must have a dedicated set of incarnations of the static fields of the classes for the code sharing bundle.

The detailed rules for code sharing bundles are as follows. The framework must not activate code sharing bundles. The code sharing bundles must not own any threads and must not instantiate any objects. The code sharing bundles act as simple code containers. As a consequence, code sharing bundles cannot register services, and the starting and stopping of code sharing bundles is not a valid operation.

The initialization of all the classes defined by a code sharing bundle is repeated for every client bundle that uses the exported code. New, dedicated incarnations of the static fields of all the classes (not just for the classes of the exported packages) of the code sharing bundle will be created during each initialization. As a consequence, each client bundle will see its own dedicated set of static fields.

An application bundle may import packages of a code sharing bundle, which code sharing bundle may also import packages of another code sharing bundle. This scenario is referred to as an "indirect import". The code-sharing bundles that provide the packages that are indirectly imported should always be re-initialized at the starting of the application bundle (gaining a new, dedicated set of static fields and static locks) as if they were directly imported by the application bundle. The indirect import mechanism may result in a situation where an application bundle may indirectly import a code sharing bundle more than once. In this case, the initialization must occur only once so that only a single set of static fields and locks are incarnated.

A dedicated set of static locks is incarnated for each client bundle (wherever the code sharing bundle uses static locks). Consequently, code sharing bundles cannot protect system-wide unique resources using static locks; application bundles must be used for this purpose. If a client bundle which was previously using the classes of the code sharing bundle is stopped and then started again, the initialization must be repeated with new incarnations of the static fields and a new set of static locks.

Figure 6:
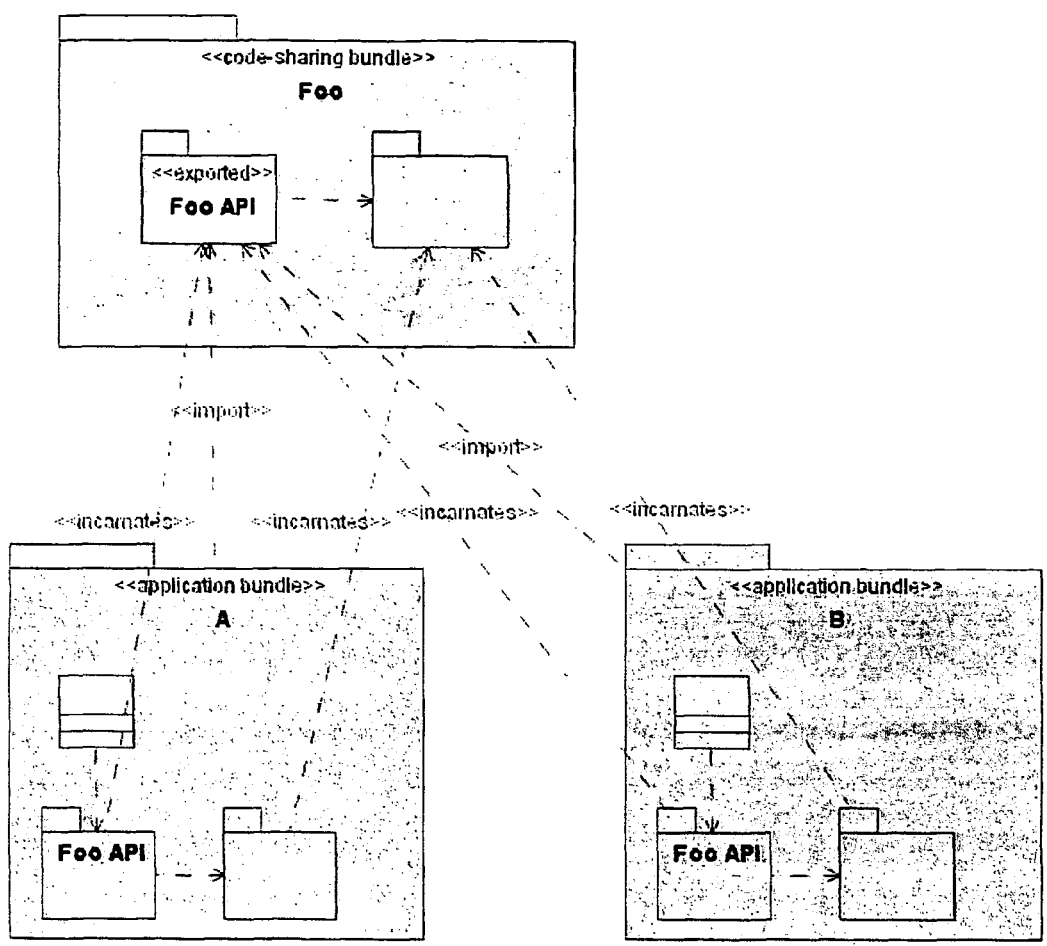
FIG. 6 is a standard UML diagram showing a representation of the process for importing packages of code sharing bundles according to the principles of the present invention.

A representation showing the importing of packages of code sharing bundles is depicted in FIG. 6. All client bundles that import the packages exported by a particular code sharing bundle must see the same types, with one limitation—references to static fields of the objects created from classes defined by code sharing bundles are mapped to the static field incarnations associated with the bundle that created the object. For example, if a code sharing bundle exports the class com.foo.A, this class has a static field A.f, and a method A.m( ) that uses the field A.f in its computations. An application bundle X gains a reference to an object a of type com.foo.A owned by another application bundle Y. References to a.f will always be mapped to the static field incarnation owned by Y and, similarly, a method call a.m( ) will always use the static field incarnation of f associated with Y in its computations, regardless which bundle executes the a.m( ) method call.

Besides exported packages, a code sharing bundle may include other packages as well. A typical use case for a code sharing bundle involves a situation where the exported packages form an application programming interface (API), whereas the non-exported packages constitute the implementation details of the particular API.

Figure 5:
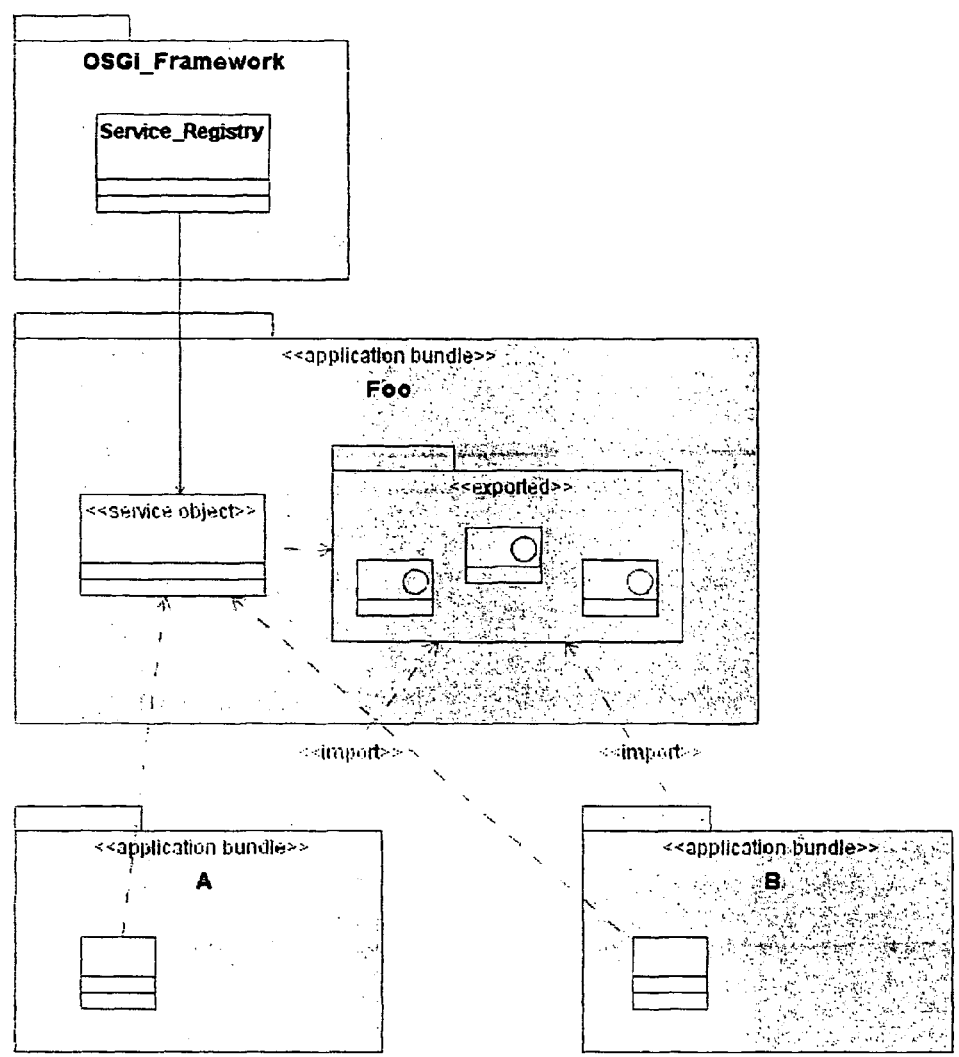
FIG. 5 is a standard UML diagram showing a representation of the package sharing process between application bundles according to the principles of the present invention.

A second type of bundle is an application bundle. Application bundles act as active applications and own objects and threads. However, application bundles must not share code; they can just provide Java interfaces for the definition of their service interfaces, if a bundle wants to provide a service. A representation of package sharing between application bundles is depicted in FIG. 5.

The detailed rules for application bundles are generally as follows. Application bundles have no limitations compared to the original bundle semantics. However, the exported packages can only contain Java interfaces, and the Java interfaces can only contain methods and fields initialized with a compile time constant. According to the Java language specification, the fields are implicitly public, static, and final.

The implementation of an OSGi system that applies the rules detailed above requires the modification of the class loader implementation.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, are intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    as a replacement for standard OSGi bundles, creating two disjunctive bundle types, including:
        a code sharing bundle type, wherein each code sharing bundle is arranged to share packages of JAVA classes and not to implement active logic; and
        an application bundle type, wherein each application bundle is arranged to implement active logic but not to share packages of Java classes.
2. The method of claim 1, wherein when a package is exported from the application bundle, the package only contains Java interfaces, and wherein the Java interfaces contain, besides methods, only fields initialized with compile time constants.

3. The method of claim 1, wherein the code sharing bundle is not permitted to register services.

4. The method of claim 1, wherein the code sharing bundle cannot be started or stopped.

5. The method of claim 1, further comprising creating dedicated incarnations of static fields for all of Java classes of the code sharing bundle during each initialization.

6. The method of claim 1, further comprising incarnating a dedicated set of static locks for each client bundle.

7. The method of claim 1, further comprising initializing each Java class and interface defined by a code sharing bundle for every client bundle that uses exported code from a code sharing bundle.

8. The method of claim 7, wherein, if a client application bundle using exported packages of the code sharing bundle is stopped and started, the initialization is repeated for each Java class and interface contained by the code sharing bundle.

9. The method of claim 1, wherein each code sharing bundle contains at least one Java class file.

10. A computer program product embodied in a non-transistor memory, comprising:
computer-executable instructions for execution by a computer for, as a replacement for standard OSGi bundles, creating two disjunctive bundle types, including:
a code sharing bundle type, wherein each code sharing bundle is arranged to share packages of JAVA classes and not to implement active logic; and
an application bundle type, wherein each application bundle type is arranged to implement active logic but not to share packages of Java classes.

11. The computer program product of claim 10, wherein when a package is exported from the application bundle, the package only contains Java interfaces, and wherein the Java interfaces contain, besides methods, only fields initialized with compile time constants.

12. The computer program product of claim 10, wherein the code sharing bundle is not permitted to register services.

13. The computer program product of claim 10, wherein the code sharing bundle cannot be started or stopped.

14. The computer program product of claim 10, further comprising creating dedicated incarnations of static fields for all Java classes of the code sharing bundle during each initialization.

15. The computer program product of claim 10, further comprising incarnating a dedicated set of static locks for each client bundle.

16. The computer program product of claim 10, further comprising initializing each Java class and interface defined by a code sharing bundle for every client bundle that uses exported code from a code sharing bundle.

17. The computer program product of claim 16, wherein, if a client application bundle using exported packages of the code sharing bundle is stopped and started, the initialization is repeated for each Java class and interface contained by the code sharing bundle.

18. An electronic device, comprising:
a processor; and
a memory unit operatively connected to the processor and including a computer program product, comprising:
computer code for, as a replacement for standard OSGi bundles, creating two disjunctive bundle types, including:
a code sharing bundle type, wherein each code sharing bundle is arranged to share packages of JAVA classes and not to implement active logic; and
an application bundle type, wherein each application bundle type is arranged to implement active logic but not to share packages of Java classes.

19. The electronic device of claim 18, wherein when a package is exported from the application bundle, the package only contains Java interfaces, and wherein the Java interfaces contain, besides methods, only fields initialized with compile time constants.

20. The electronic device of claim 18, wherein the code sharing bundle is not permitted to register services.

21. The electronic device of claim 18, wherein the code sharing bundle cannot be started or stopped.

\* \* \* \* \*